July 7, 1942. A. H. BLOHM Re. 22,129

WEB FEEDING MECHANISM

Original Filed March 8, 1930 3 Sheets-Sheet 1

INVENTOR
August H. Blohm
BY
Ward, Crosby & Neal
ATTORNEYS

July 7, 1942. A. H. BLOHM Re. 22,129

WEB FEEDING MECHANISM

Original Filed March 8, 1930 3 Sheets-Sheet 2

INVENTOR
August H. Blohm
BY
Ward, Crosby & Neal
ATTORNEYS

July 7, 1942. A. H. BLOHM Re. 22,129

WEB FEEDING MECHANISM

Original Filed March 8, 1930 3 Sheets-Sheet 3

INVENTOR
August H. Blohm
BY
Ward, Crosby & Heal
ATTORNEYS

Reissued July 7, 1942

Re. 22,129

UNITED STATES PATENT OFFICE 22,129

WEB FEEDING MECHANISM

August H. Blohm, Oak Park, Ill., assignor to Trans-Lux Corporation, a corporation of Delaware Original No. 2,098,940, dated November 16, 1937, Serial No. 434,272, March 8, 1930. Application for reissue September 20, 1939, Serial No. 295,808

5 Claims. (Cl. 178—24)

My invention relates to web feeding mechanism particularly such as is utilizable for feeding a character-bearing web or tape through a projection field or with respect to a picture aperture.

It is an object of the invention to provide an apparatus of this type and which will embody structurally and functionally improved features over apparatus of similar character as heretofore constructed.

It is a further object of the invention to provide a web feeding mechanism by means of which the web will be efficiently and precisely moved through the projection field and so that a satisfactory indicia-presenting image will be projected upon the screen or other surface with which the present mechanism is combined.

An additional object is that of furnishing an apparatus of this character and which will embody relatively few and rugged parts capable of being readily assembled and serviced and, when so assembled, operating over long periods of time with freedom from all difficulties.

For an understanding of my invention and for an illustration of one of the many forms thereof, reference is to be had to the accompanying drawings, in which.

Figure 1:
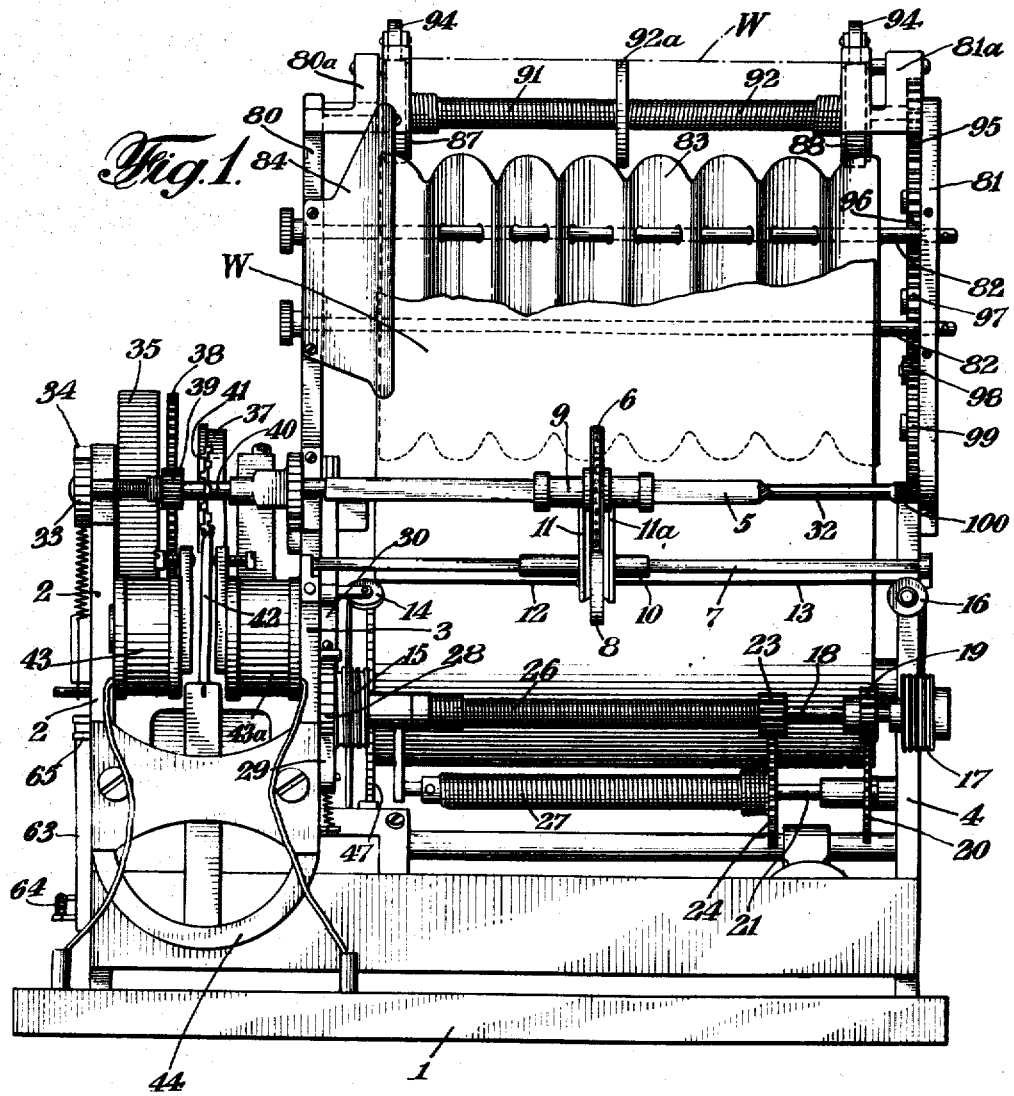
Figure 1 is a front elevational view of apparatus constructed in accordance with my invention.
Figure 2:
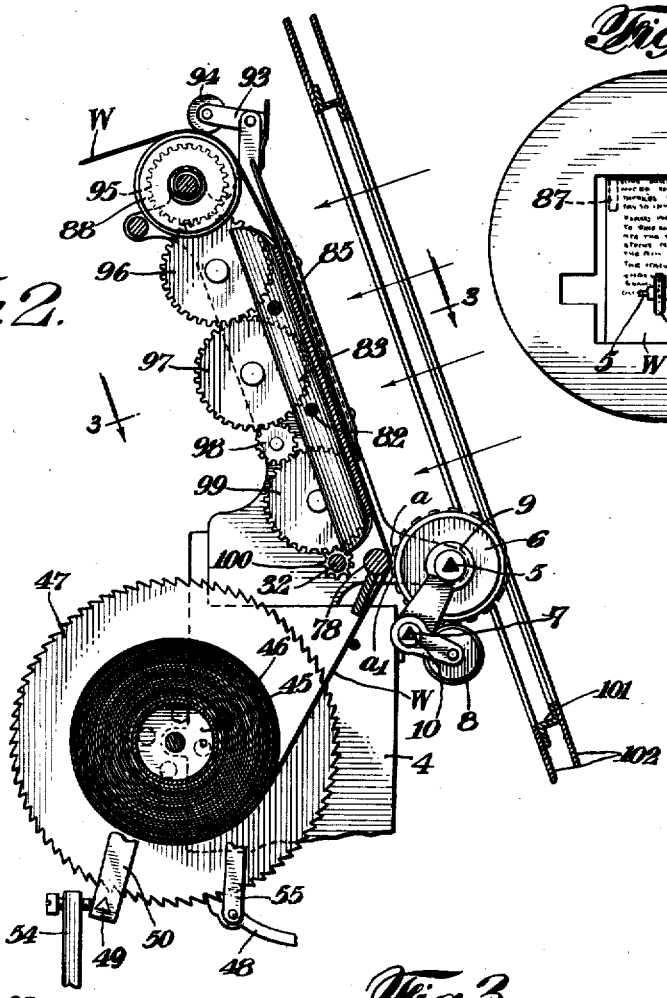
Fig. 2 is a vertical sectional view, partly in elevation, of a part of the apparatus shown in Fig. 1.

Referring to Fig. 1, 1 represents a suitable base from which the spaced plates 2, 3, and 4 extend upwardly. A shaft 5 journaled in the plates 3 and 4 carries a printing wheel 6 having characters distributed peripherally thereof. A guide member 7 carried by said plates 3 and 4 is positioned to one side of a roller 8 which receives ink from any suitable source, not shown, and transfers the same to the printing wheel 6. Rotatable with the wheel 6 is a sleeve 9 freely slidable on the shaft 5 while a second sleeve 10 is freely slidable on the guide member 7. These sleeves are connected for movement as a unit by a frame comprising the members 11 and 11a which have side-by-side extensions forming a bearing for the aforesaid roller 8, as shown in Fig. 2. The sleeve 9 forms a splined connection with the shaft 5 which is triangular whereby the wheel 6 is rotatable with said shaft while at the same time freely movable along the same in an axial direction.

Connected to opposite sides of the frame are flexible elements 12 and 13. The flexible element 12 extends into coacting relation with a pulley 14 and then to a drum 15 to which it is connected, said drum 15 having a peripherally formed spiral groove. The flexible element 13 extends into coacting relation with a pulley 16 and then to a drum 17 to which it is connected, said drum 17 also having a peripherally formed spiral groove. The spiral grooves on the drums 15 and 17 are adapted for the reception of the respective flexible elements 12 and 13 upon which they wind in opposite directions so that one winds up as the other winds off.

The drums 15 and 17 are rotatable with a shaft 18 mounted in bearings in the plates 3 and 4, said shaft 18 having rotatable therewith a pinion 19 which meshes with a gear 20 carried by a shaft 21 also mounted in bearings in the plates 3 and 4. The shaft 18 carries a pinion 23 which meshes with a gear 24 carried by the shaft 21. Springs 26 and 27 are coiled about the respective shafts 18 and 21. The arrangement of these springs is such that rotation of the shaft 18 in one direction causes the springs to be wound; said springs thereby tending to rotate the shaft 18 in the opposite direction.

Figure 6:
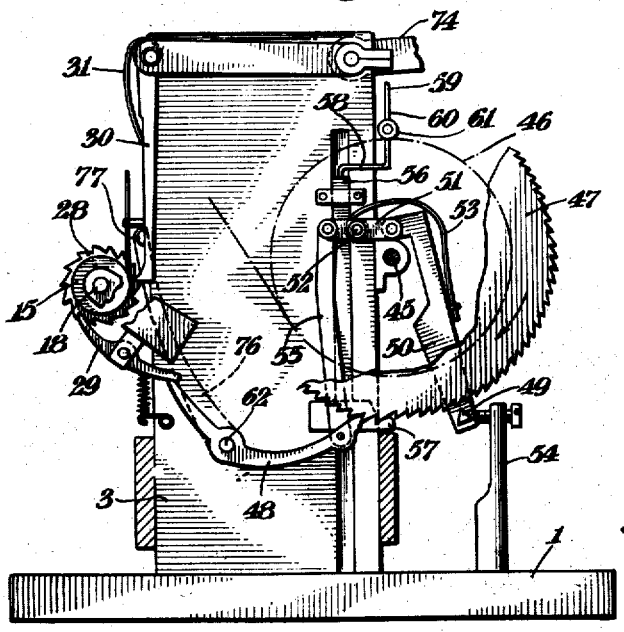
Fig. 6 is a side elevational view, partly broken away, of other control mechanism.

The shaft 18 carries a ratchet wheel 28 with which coacts a holding pawl 29 pivoted to the plate 3, as shown in Figs. 1 and 6. An actuating pawl 30 also coacts with the ratchet wheel 28 by a spring 31 which biases said pawl 30 in a clockwise direction as viewed in Fig. 6. The pawl 30 is actuated as hereinafter described.

Figure 5:
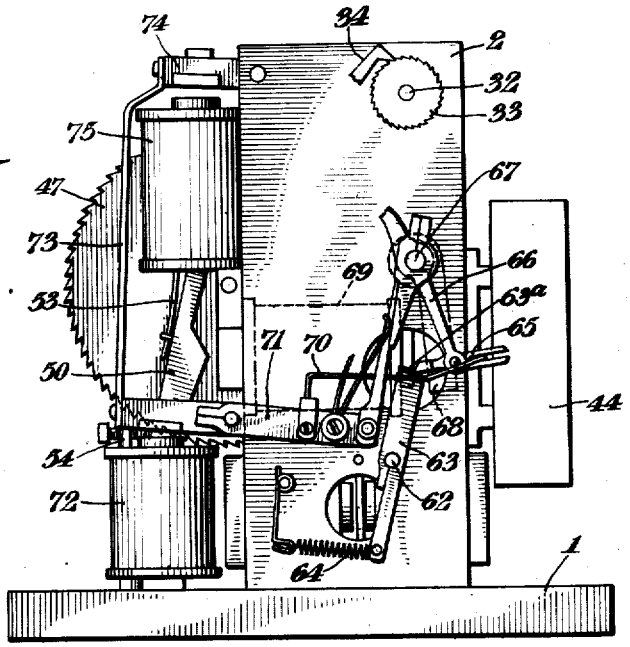
Fig. 5 is a side elevational view of certain control mechanism.

Rotatable in bearings in the plates 2, 3, and 4 is a drive shaft 32 carrying, exteriorly of the plate 2, a ratchet wheel 33, Fig. 5, with which a pawl 34 coacts. The shaft 32 carries a fly wheel 35 and a sleeve 36 freely rotatable thereon, the sleeve having a housing 37 and a gear 38 movable therewith. The housing 37 contains a coiled leaf spring, one end of which is connected thereto and the other end of which is connected to the shaft 32.

The gear 38 meshes with a gear 39 rotatable with a shaft 40 disposed between the plates 2 and 3 and in alinement with the aforesaid shaft 5 to which it is rotatably connected. Rotatable with the shaft 40 is a scape-wheel 41 with which coacts the end of an armature 42 actuatable by the coils 43, 43*a* which are associated with the magnet 44.

Rotatable in bearings in the plates 3 and 4 is a shaft 45 adapted to receive a cylinder upon which has been wound a web of paper or the like, the paper roll being indicated at 46 in Fig. 6 and being disposed at one side of an end plate 47 carried by the end of the shaft 45 and rotatable therewith.

The end plate 47 is notched on its periphery as shown in Fig. 6 and coactable therewith is a pivoted pawl 48 and a pawl element 49. The latter is carried by a lever 50 pivoted on a member 51 in turn pivoted at 52 on the side plate 3. The lever 50 is biased in a counter-clockwise direction by a spring 53, movement in such direction being limited by a stop member 54 upstanding from the base 1. Pivoted to that end of member 51 removed from lever 50 is one end of a link 55, the other end of which is pivoted to the aforesaid pawl 48.

Slidable vertically along the plate 3 is a member 56 carrying at its lower end, a member 57 which forms a stop limiting clockwise movement of the lever 50. The member 56 is disposed beyond the end plate 47 and, at its upper end, carries a member 58 which comprises an angular section 59 extending above the paper roll 46 and terminating in a downwardly extending section 60 carrying a roller 61 coactable with said paper roll 46.

The aforesaid pawl 48 is carried by and oscillatory with a shaft 62 journaled for movement in the plates 2 and 3. As shown in Fig. 5, the shaft 62 extends beyond the plate 2 and there carries a lever 63 which is movable therewith and biased in a clockwise direction by a spring 64. The lever 63 has a nose 63*a* with which is coactable a pawl 65 pivoted on the end of a lever 66 carried by and oscillatory with a shaft 67 also extending between the plates 2 and 3, where it carries an armature 68 coactable with an electromagnet coil 69.

The end of the aforesaid pawl 65 is bifurcated for the slidable reception of one end of a member 70 carried by the pivoted armature 71 of an electromagnet coil 72. As shown in Fig. 5, the armature 71 is connected by a member 73 with the pivoted armature 74 of another electromagnet coil 75.

Again referring to Fig. 6, the pawl 48, at the end thereof removed from the plate 47, is shown as coactable with the otherwise free end of the holding pawl 29. Between the plates 2 and 3, the shaft 62 carries a lever 76 which is oscillatory therewith and, at its free end, has a lateral extension 77 coactable with the actuating pawl 30, as hereinafter described.

As illustrated in Fig. 2, the web W from the paper roll 46 passes along a path which extends closely adjacent the printing wheel 6 where it bends around a platen 78, the web W being maintained taut as hereinafter described.

Mechanism of the type heretofore described is well known to the printing telegraph art as a Burry printer and is substantially the same as that described and illustrated in U. S. Letters patent to Burry, 680,693, August 20, 1901, to which reference may be had for a more complete disclosure of the printing mechanism and the operating mechanism therefor.

Assuming that the spring in the housing 37 is energized, the operator, in response to successive energization of the coils 43 and 43*a*, may vibrate the armature 42 to an extent permitting rotative movement of the printing wheel 6 until the character which is to be printed is either in position *a* or position $a_1$, Fig. 2. Rotative movement of the printing wheel 6 thus occurs because the spring in housing 37 imparts rotative movement to the gears 38, 39, shaft 40, the scape-wheel 41 and shafts 40 and 5 when the armature 42 is vibrated as stated above, the number of half-cycles made by said armature 42 determining the position to be taken by the scape-wheel 41 and the printing wheel 6.

After the character to be printed has been brought to either position *a* or $a_1$ as stated above, an operation is performed by suitable mechanism, not shown, whereby the printing wheel 6 is moved slightly in one direction or the other to position said character in printing position and to temporarily lock said wheel 6 in its last named position.

Thereafter, by suitable mechanism, the platen 78 is quickly moved from left to right, as Fig. 2, to press a section of the web W against that character now in printing position, the platen 78 immediately returning to the position shown in Fig. 2.

Immediately after this operation, the actuating pawl 30 is moved downwardly, to rotate the ratchet wheel 28 and shaft 18 one step in a clockwise direction as viewed in Fig. 6. As a result, the drums 15 and 17 are similarly rotated, the former paying out the flexible element 12 and the latter taking up the flexible element 13. Accordingly, the printing wheel 6 is moved one step from left to right, as in Fig. 1, into position laterally of the web W where the next character is to be printed. In response to the aforesaid rotation of shaft 18, the springs 26 and 27 are somewhat energized but they are ineffective to rotate the shaft 18 in reverse direction at this time due to the action of holding pawl 29 on ratchet wheel 28.

The operation described above is repeated successively, characters on the printing wheel 6 being selected as desired to print a line or a part of a line of information. When the printing wheel 6 has reached the limit of its path of movement to the right, as in Fig. 1, or some intermediate position and it is desired to return the same to the limit of its path of movement to the left, Fig. 1, the initial position of the printing wheel 6, the following operations are performed:

After the last letter has been printed, the circuit through the magnets 43, 43*a* is broken and, in response to a suitable operation, the parts exteriorly of the plate 2 come to the position shown in Fig. 5. In response to energization of the magnet 69, the armature 68 is attracted whereby the shaft 67 is rotated clockwise, to similarly move the lever 66 and to cause the pawl 65, by engagement with the nose 63*a*, to rock the lever 63 in a counter-clockwise direction, whereby the shaft 62 is rotated in the same direction.

In response to such rotation of the shaft 62, the lever 76 and pawl 48 are swung in a clockwise direction, as in Fig. 6, the lever 76 disengaging the actuating pawl 30 from the ratchet wheel 28 and the pawl 48 disengaging the pawl 29 from said ratchet wheel. The latter and the shaft 18 are then free to rotate in a counter-clockwise direction, Fig. 6, which they immediately do under the influence of the springs 26 and 27. These, during movements of the printing wheel 6 from left to right, Fig. 1, have had progressively increasing amounts of energy stored therein. Rotation of the shaft 18 as last described imparts similar rotative movement to the drums 15 and 17, the former taking up its flexible element 12 and the latter paying out its flexible element 13. Due to such movement of the flexible elements 12 and 13, the printing wheel 6 is returned to the left or initial position.

As a further result of the last described rotation of shaft 62 which, as stated, swings the pawl 48 in a clockwise direction, Fig. 6, the end of said pawl 48 is removed from engagement with the teeth on the periphery of plate 47 and, through the link 55, the member 51 is swung in a counterclockwise direction, whereby the pawl 49 of lever 50 is moved into engagement with the toothed periphery of plate 47. The result effected by this operation will be hereinafter described.

In accordance with my invention, the web W is moved through a projection field or zone, or with respect to a picture aperture where a light beam coacts therewith to produce on a suitable screen images of the characters on that section of the web within said projection field or picture aperture. Further in accordance with my invention, suitable mechanism is provided immediately adjacent that side of the projection field or picture aperture removed from the printing wheel 6 for imparting a step of movement to the web W each time that said printing wheel returns to its initial position. Such mechanism may assume any one of a variety of forms, one only of which is herein illustrated and described for purposes of explanation of my invention.

Referring to Fig. 1, the plates 3 and 4 are shown, respectively, as having supplementary plates or members 80 and 81 secured thereto in any suitable manner and upstanding therefrom. Extending through said plates are spaced tie rods 82 supporting a web-backing plate 83 which, if desired but not necessarily, may be corrugated or undulating as illustrated. Carried by the respective plates 80 and 81 are the sheet-like members 84 and 85 which extend toward each other and are formed, preferably, of resilient material so that they are inherently biased toward the backing plate 83.

Rotatably mounted in the aforesaid plates 80 and 81 immediately adjacent the top thereof is a shaft 86 which carries the web-feeding rollers 87 and 88 spaced a distance slightly less than the width of the web and each of which, on its outer peripheral surface, may carry a ring 89 of relatively soft material, as soft rubber or the like. As illustrated particularly in Fig. 4, the rollers 87 and 88 are so connected to the shaft 86 that they are freely rotatable thereon but incapable of movement longitudinal thereof. This result is obtained, in the example shown, by the provision of the roller-carrying pins 90 which enter peripheral slots provided respectively therefor in the shaft 86.

Oppositely coiled on the shaft 86 are a pair of spiral spring structures 91 and 92, adjacent ends of said spring structures 91 and 92 being suitably secured to the shaft 86 adjacent its center, as by connection to a disk 92a carried by and rotatable with said shaft 86. The other end of spring structure 91 is suitably connected to the hub of roller 87 and the other end of spring structure 92 is similarly connected to the hub of roller 88.

The plates 80 and 81 may carry, respectively, the extensions 80a and 81a which extend toward each other, each pivotally supporting an arm 93 carrying an idler roller 94, the idler rollers 94 overlying the respective rollers 87 and 88 and being suitably biased toward the latter.

Figure 3:
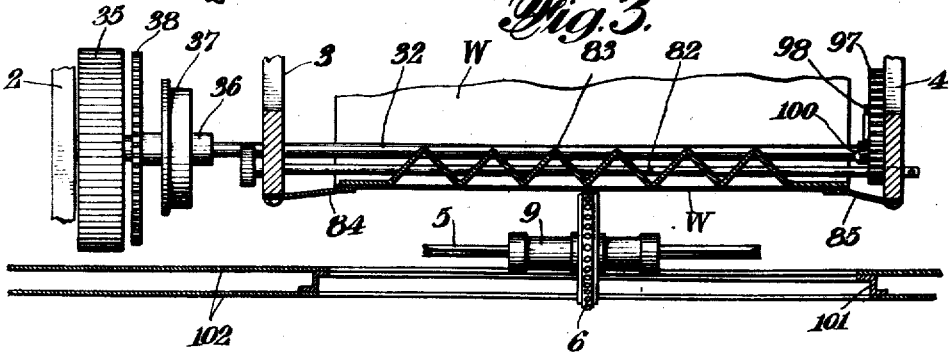
Fig. 3 is a horizontal sectional view, partly in plan, and is taken on the line 3—3 of Fig. 2 looking in the direction of the arrows.

In accordance with my invention, the web W is extended immediately adjacent one side of the backing plate 83, opposite edges of said web being disposed between said backing plate and the sheet-like members 84 and 85, Fig. 3. Beyond the backing plate 83, the web W extends over the feed rollers 87 and 88 and is firmly held in engagement therewith by the biased idler rollers 94 shown in Figs. 2 and 4.

Figure 4:
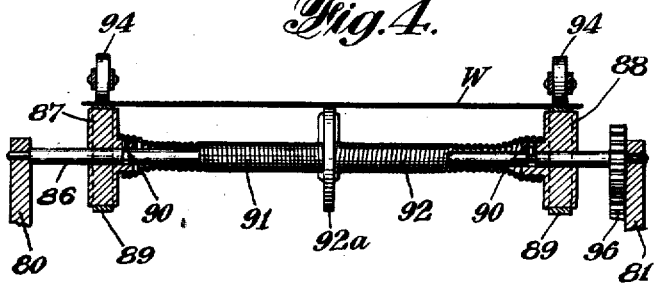
Fig. 4 is a vertical sectional view, partly in elevation, of the upper part of the apparatus shown in Fig. 1.

As shown in Figs. 1, 2, and 4, the shaft 86, adjacent the plate 81, carries a gear 95 which meshes with the end gear 96 of a gear train comprising the gears 97, 98, and 99, said gears 96, 97, 98, and 99 being suitably mounted for free rotatable movement on the plate 81. The gear 99 meshes with a pinion 100 secured to and rotatable with the drive shaft 32.

During operation of the printing mechanism, the pawl 34, Fig. 5, intermittently operates the ratchet wheel 33 whereby the shaft 32 partakes of similar rotative movement. Due to such movement of the shaft 32, the spring in the housing 37 is also wound. Due also to such movement of the shaft 32, the gear train comprising the gears 100, 99, 98, 97, 96, and 95 are actuated to intermittently rotate the shaft 86. The shaft 32, or equivalent thereof, is a source of power by which rotation of the printing wheel 6 and movement of the web W is effected.

In accordance with my invention, the web W is extended through the projection zone or field as shown particularly in Fig. 2, the idler rollers 94 clamping adjacent sections of the web against the feed rollers 87 and 88. In this position, the web remains stationary while the printing wheel 6 starts from its initial position at the left, Fig. 1, and moves to the right to print all or a part of a line of characters. At this time, also, the roll of paper 46 is maintained stationary due to coaction of the pawl 48 with the plate 47 as shown in Fig. 6.

As the printing wheel 6 moves further and further to the right, as in Fig. 1, the shaft 32 is rotated, due to the above described action of pawl 34, and, due to the gear train, the shaft 86 is also rotated. However, movement of the feed rollers 87 and 88 does not occur at this time because movement of the paper roll 46 is prevented as just stated and, therefore, the web W remains stationary. Since the web is stationary, the feed rollers 87 and 88 also remain stationary since they are clamped to said web by the idler rollers 94.

Therefore, the shaft 86 rotates while the feed rollers 87 and 88 remain stationary and, as a result, the springs 91 and 92 are wound. Eventually, when the shaft 62 is actuated, to cause the printing wheel 6 to return to its initial position, the pawl 48 is disengaged from the plate 47 all as hereinbefore described. The roll of paper 46 is now freed from restraint and, accordingly, the springs 91 and 92 become effective to rotate the feed rollers 87 and 88 whereby the web is moved by said feed rollers 87 and 88 through the projection field or zone, and with respect to and by the printing wheel 6.

Such movement of the web W may be limited in any suitable manner. As shown, although not necessarily, the pawl 49 moves into engagement with the plate 47 at the time of disengagement therefrom of the pawl 48. Accordingly when the paper roll 46 and the plate 47 move in a clockwise direction, Fig. 6, under the influence of the feed rollers 87 and 88, the pawl 49 and lever 50 move therewith, the latter soon coming into contact with the member 57 and discontinuing movement of the paper roll 46 and the web W, the latter now being in its next projecting position.

The member 57 is adjustable vertically under the influence of roller 61 to position said member 57 in different vertical positions in accordance with the diameter of the paper roll 46. As a result, the spacing between adjacent lines of printed matter on the web is rendered independent of the diameter of the paper roll.

After the action described above has been accomplished, the magnet 69 is released whereby the shaft 62 rotates counter-clockwise, as in Fig. 6, and the parts come into the normal position shown and the next line of information may be printed on the web W.

Figure 7:
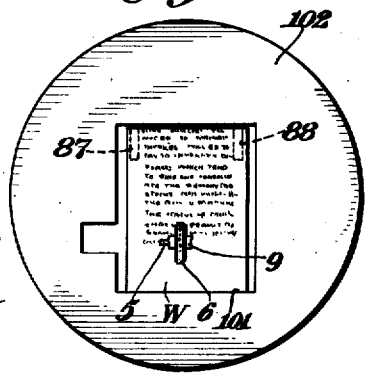
Fig. 7 is an elevational view, reduced in scale and with parts omitted, and looking in the general direction of the arrows shown in Fig. 2.

As shown particularly in Figs. 2 and 7, the web W is moved through the projection field or zone by apparatus constructed and arranged in accordance with my invention. While in such zone, light or a light beam coacts substantially with a section of the web W which may be defined or framed by an aperture 101 of a plate structure 102. This as disclosed in my copending application Ser. No. 434,273, filed March 8, 1930 may be the wall of a lamp housing, images of the characters on said web section being projected onto a suitable screen.

As illustrated, the web-feeding mechanism, i. e. the rollers 87 and 88, in the example shown, (although this arrangement may be varied as desired) are positioned at the side of the projection zone opposite the printing wheel 6 which, as shown but by no means necessarily, is positioned within said zone. But one device or mechanism, namely, the rollers 87 and 88, in the example shown, is utilized for moving or feeding the web W through the projection zone, and with respect to and by the printing wheel 6. This web feeding mechanism, as herein illustrated and described, is under the control of the operator and is intermittently operated by control of the same mechanism that returns the printing wheel 6 to its initial position. Such control of the web W is highly desirable and, to a marked extent, is more advantageous than arrangements of the prior art wherein a plurality of independent devices are utilized for feeding the web, one of said devices ejecting the web from the printing mechanism and the other of said devices moving the web through the projection zone.

Although my invention has been illustrated and described in connection with a projection system of the "reflecting" character, it shall be understood that the invention is not to be so limited since, as well, it is applicable to projection systems of the "through" type wherein the light beam passes from the source of light through the web and then to the eyes of the audience.

It shall be understood that the arrangement herein illustrated for imparting movement to the web is one only of many suitable arrangements which may be utilized and that my invention, particularly as regards the herein described gear train is not to be limited to the disclosed arrangement.

Still further, it shall be understood that my invention is not to be limited to printing mechanisms of the type herein illustrated, i. e., a Burry printer since certain broad and important features of my invention are applicable to other types of printing mechanisms such, for example, as those known to the art as Dow-Jones printers.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a bulletin printing apparatus, a telegraph printer adapted to print transversely of a web, a web take-up mechanism, a panel extending between said printer and take-up mechanism and means for maintaining said web continuously in contact with said panel as it passes from the printer to the take-up mechanism.

2. In a bulletin printing apparatus, a telegraph printer adapted to print transversely of a web, a panel extending upwardly from said printer and separately driven take-up means acting at opposite margins of the web to draw the same upwardly across the panel and for applying a continuous tension thereto in order to maintain the web in contact with the panel.

3. In a bulletin printing apparatus, a telegraph printer adapted to print transversely of a web, a panel extending upwardly from said printer and separately driven take-up means acting at opposite margins of the web to draw the same upwardly across the panel and for applying a continuous tension thereto in order to maintain the web in contact with the panel, said take-up means being resilient whereby the web is rendered yieldable during the printing stroke.

4. In a bulletin printing apparatus, a telegraph printer adapted to print transversely of a web, a platen for said printer across which the web passes, a panel extending upwardly from said printer and separately driven take-up means acting at opposite margins of the web to draw the same upwardly across the panel and to apply a continuous tension thereto in order to maintain the web in contact with the panel, said take-up means, platen, and the surface of the panel being disposed substantially in line.

5. In a bulletin printing apparatus, a telegraph printer adapted to print transversely of a web, a platen for said printer across which the web passes, a panel extending upwardly from said printer, take-up means for drawing the web upwardly across the panel, said take-up means, the platen and the surface of the panel being disposed substantially in line.

AUGUST H. BLOHM.